US012742568B2

(12) United States Patent
Hartland

(10) Patent No.: US 12,742,568 B2
(45) Date of Patent: Sep. 22, 2026

(54) VALVE ASSEMBLY FOR AC CONDENSATE LINE

(71) Applicant: Frank Joseph Hartland, Englewood, FL (US)

(72) Inventor: Frank Joseph Hartland, Englewood, FL (US)

( * ) Notice: Subject to any disclaimer, the term of this patent is extended or adjusted under 35 U.S.C. 154(b) by 178 days.

(21) Appl. No.: 18/746,284

(22) Filed: Jun. 18, 2024

(65) Prior Publication Data

US 2025/0198649 A1 Jun. 19, 2025

Related U.S. Application Data

(60) Provisional application No. 63/610,003, filed on Dec. 14, 2023.

(51) Int. Cl.
*F24F 13/22* (2006.01)
*B08B 9/032* (2006.01)

(52) U.S. Cl.
CPC .......... *F24F 13/222* (2013.01); *B08B 9/0321* (2013.01); *F24F 2013/227* (2013.01); *F24F 2221/225* (2013.01); *Y10T 137/4259* (2015.04)

(58) Field of Classification Search
CPC . F24F 13/227; F24F 2221/225; F24F 203/227
See application file for complete search history.

(56) References Cited

U.S. PATENT DOCUMENTS 4,022,382 A 5/1977 Engdahl, Jr.
4,993,453 A * 2/1991 McHugh ................ A62C 35/68 251/315.01
5,085,244 A 2/1992 Funk
D325,621 S * 4/1992 Hengesbach ................ D23/245
5,232,200 A * 8/1993 Combeau .............. F16K 5/0673 251/315.01
5,735,307 A * 4/1998 Charron ................ F16K 5/0642 251/315.01
6,041,611 A 3/2000 Palmer
6,068,023 A 5/2000 Potter
6,182,677 B1 2/2001 Pignataro
6,467,995 B2 10/2002 Bevilacqua et al.
6,701,740 B1 3/2004 Hernandez-Zelaya
6,708,717 B1 3/2004 Coogle
7,448,405 B2 11/2008 Shores
7,669,834 B2 * 3/2010 Hampton, Sr. ......... F16K 27/06 251/315.1
7,930,898 B2 4/2011 Laufenberg et al.
8,156,956 B1 4/2012 Coogle
9,217,580 B2 12/2015 Oakner et al.
(Continued)

OTHER PUBLICATIONS

Brass shut off valve, Amazon.com (Year: 2021).*

*Primary Examiner* — Christopher R Zerphey
(74) *Attorney, Agent, or Firm* — Dunlap Bennett & Ludwig PLLC

(57) ABSTRACT

The present disclosure discloses a valve assembly. The valve assembly includes a tee shaped structure configured to receive water from a garden hose and an air conditioner condensate line, and configured to output the water to a drain line. The valve assembly further includes one or more valves disposed on the tee shaped structure. The valves are configured to regulate a flow of water to the drain line from the garden hose and/or the air conditioner condensate line.

6 Claims, 2 Drawing Sheets

(56) References Cited

U.S. PATENT DOCUMENTS

| | | | |
|---|---|---|---|
| 10,850,312 | B2 | 12/2020 | Rechlin |
| 11,181,299 | B2 | 11/2021 | Rechlin |
| 2020/0129910 | A1 | 4/2020 | Barness |

* cited by examiner

VALVE ASSEMBLY FOR AC CONDENSATE LINE

CROSS-REFERENCE TO RELATED APPLICATION

This application claims the benefit of priority of U.S. provisional application No. 63/610,003, filed Dec. 14, 2023, the contents of which are herein incorporated by reference.

BACKGROUND OF THE INVENTION

The present invention relates generally to a valve assembly for an air conditioning condensate line, and more particularly to a valve assembly that allows the user to flush their air conditioning condensate line with a garden hose without flooding the air handler.

Over time, air conditioner condensate lines fill with mold growth, which ultimately leads to the drain line backing up with water. This stops the air conditioner from working properly and causes frustration and discomfort for the user until the issue is resolved. Often, the blockage is halfway down the line and is extremely difficult to unclog without specialty tools.

Therefore, a system is required that enables a user to conveniently and easily unclog the air conditioner condensate line.

SUMMARY OF THE INVENTION

The following presents a simplified summary of the present disclosure in a simplified form as a prelude to the more detailed description that is presented herein.

In accordance with preferred embodiments of the present invention, there is provided a valve assembly. The valve assembly includes a tee shaped structure configured to receive water from a garden hose and an air conditioner condensate line configured to output the water to a drain line. The valve assembly further includes one or more valves disposed on the tee shaped structure. The valves are configured to regulate the flow of water to the drain line from the garden hose and/or the air conditioner condensate line.

The valve assembly, as disclosed in the present disclosure, attaches to the condensate line, and allows the user to attach a garden hose onto the condensate line. Once turned on, the hose flushes out all blockages and debris quickly and without the need for specialty tools or technicians.

These and other features, aspects, and advantages of the present invention will become better understood with reference to the following description.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a valve assembly for an AC condensate line, and more particularly to a valve assembly that allows the user to flush their air conditioning condensate line with a garden hose without flooding the air handler.

Figure 1:
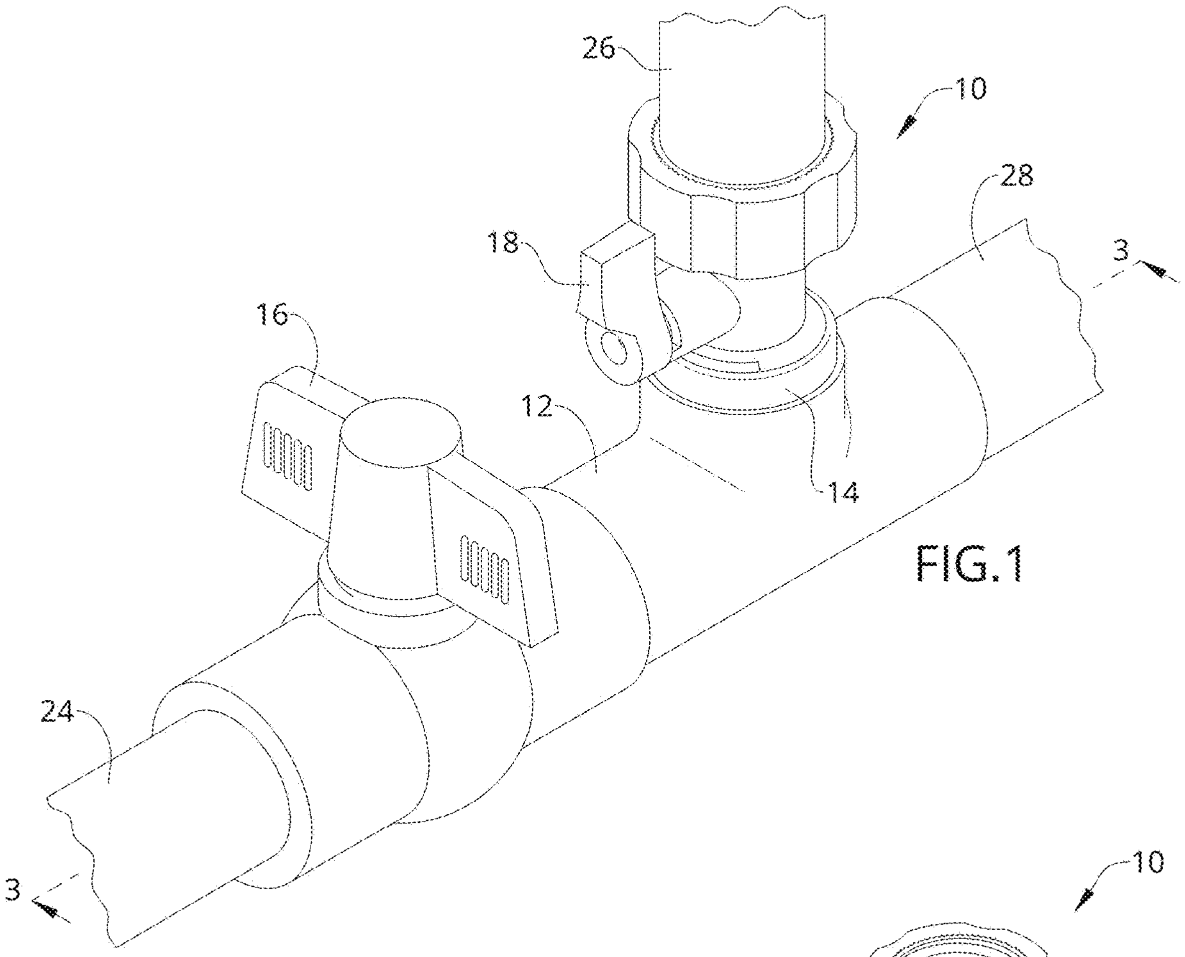
FIG. 1 is a perspective view of a valve assembly for an AC condensate line in accordance with a preferred embodiment of the present invention.
Figure 2:
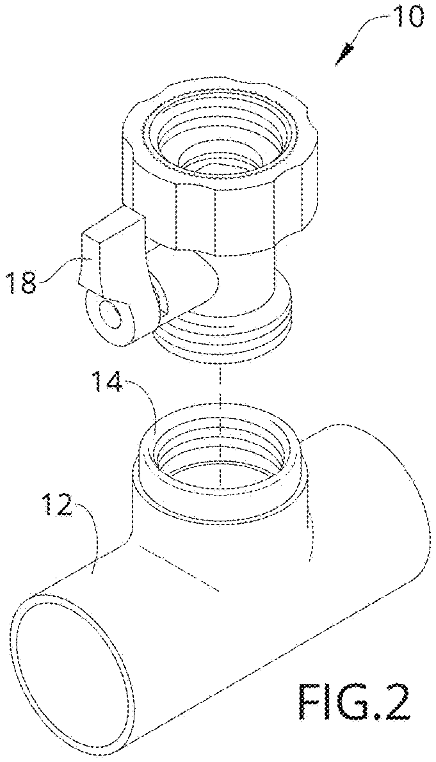
FIG. 2 is an exploded view of the valve assembly of FIG. 1.

FIG. 1 depicts a perspective view of a valve assembly 10 (or tee assembly) in accordance with preferred embodiments of the invention. FIG. 1 will be described in conjunction with FIGS. 2, 3 and 4. The valve assembly 10 (or assembly 10) includes a tee 12, an insert 14, and a garden hose valve 18. The assembly 10 may be attached with an air handler drain line 24 via a coupling 20. The coupling 20 may include a ball valve 16. The assembly 10 may be further attached with a garden hose line 26 and a drain exit line 28.

The components required to make the assembly 10 include a brass ball valve 18, with male to female threads (garden hose thread, seen in FIG. 2 by way of example), Teflon thread sealing tape, custom PVC tee 12 with slip fittings on 2 sides and garden hose thread metal insert 14 at the top section, 0.5 to 1.5 inch piece of schedule 40 PVC pipe, and 0.75 inch schedule 40 slip ball valve 18.

To make the assembly 10, the Teflon tape is applied to the male end of the brass valve 18 and threaded into the custom PVC tee 12. Then the piece of 0.5 to 1.5 inch piece of schedule 40 PVC pipe is attached to both the 0.75 inch schedule 40 slip ball valve 18 and the custom PVC tee.

During installation of the assembly 10, an approximately six inch piece is cut out and removed from the user's existing AC condensate line 24. This cut is made as close as possible to the air handler (not shown). Using PVC glue, the assembly 10 is attached to the condensate line 24 where the pipe was removed and therefore becomes part of the AC drain line 28. The assembly 10 must be installed with a PVC ball valve 16 on the side of the condensate line closest to the air handler.

Once installed, the user flushes their AC drain line 28 as follows: Firstly, the user turns off the AC system. The user then attaches the garden hose (turned off) to brass valve 18 of assembly 10. The user then turns the PVC ball valve 16 to its closed position. The user then turns the brass valve 18 to its "Open" position. The user then turns the water on to garden hose 26. The user then allows blockage to unclog until clear water runs smoothly out of condensate line 28. Thereafter, the user turns off the garden hose 26. The user then removes the garden hose 26 from assembly 10. The user then turns the brass valve 18 to the "Closed" position. The user then turns the PVC ball valve 16 to the "Open" position and turns the AC system back on.

Figure 3:
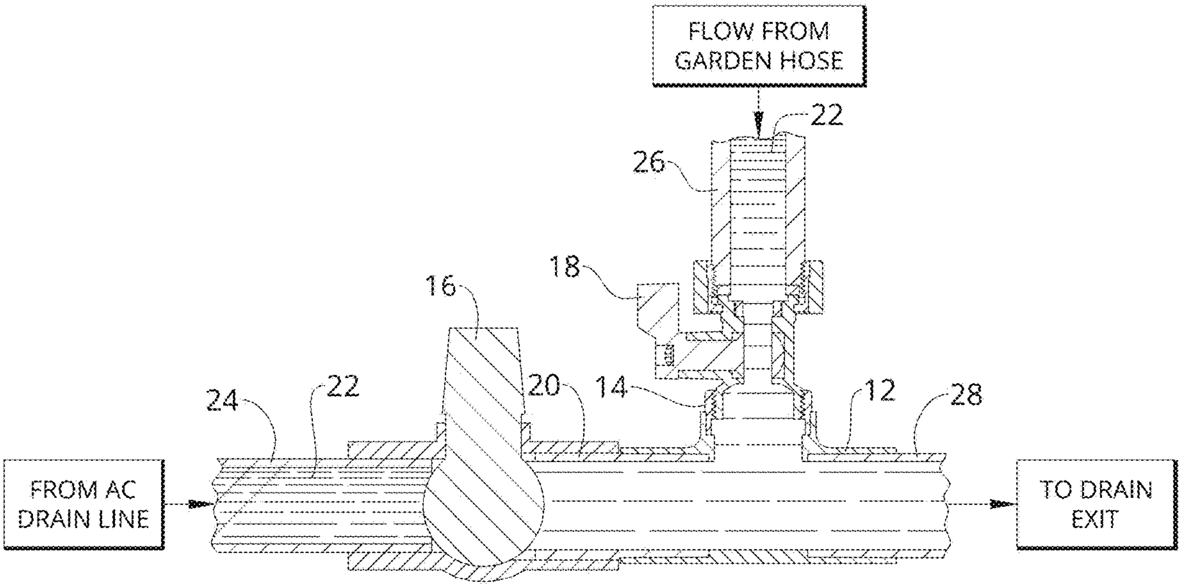
FIG. 3 is a cross-sectional view of the valve assembly taken along line 3-3 of FIG. 1.
Figure 4:
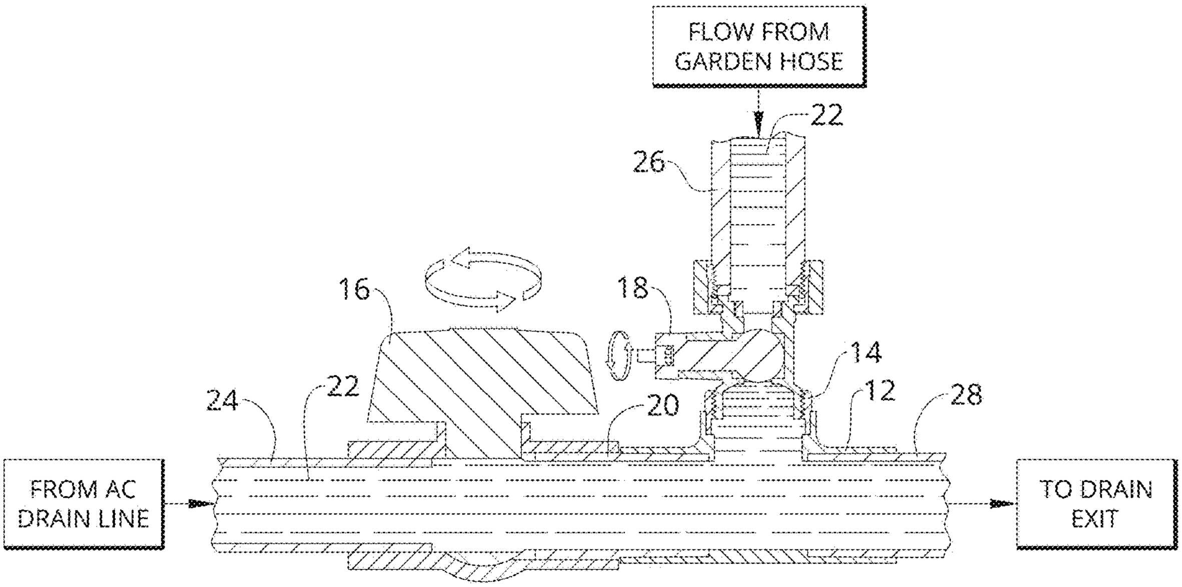
FIG. 4 is a cross-sectional view of the valve assembly taken along line 3-3 of FIG. 1 showing motion of the ball valve and the garden hose valve.

As shown in FIG. 3, when the ball valve 16 is closed and the garden hose valve 18 is open, water 22 flows from the garden hose 26 towards the drain exit line 28, thereby unclogging the AC condensate line. In this arrangement, the water 22 from the coupling 20 does not flow towards the drain exit line 28. On the other hand, as shown in FIG. 4, when the ball valve 16 is open and the garden hose valve 18 is closed, the water 22 flows from the coupling 20 towards the drain exit line 28 (and not from the garden hose towards the drain exit line 28).

In some aspects, the brass valve 18 may be replaced with a fixed garden hose fitting and a cap, rather than a valve. The brass valve 18 may further be replaced with a plastic version. The custom tee 12 may be replaced with an offthe-shelf version. However, the function remains the same. There must be a valve to stop water flowing back to the air handler, and a hose connection in front of it to allow the water to flow through the line under pressure.

The assembly 10 could also be used in irrigation systems to unclog sediment filled pipes. The assembly 10 could also be used to put bleach, vinegar or other chemicals into the condensate line, through the brass fitting.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

It should be understood, of course, that the foregoing relates to exemplary embodiments of the invention and that modifications may be made without departing from the spirit and scope of the invention as set forth in the following claims.

What is claimed is:

1. A condensate drain line service assembly for installation in a condensate drain line of an HVAC system upstream of an air handler, the assembly comprising:

a unitary rigid tee fitting having a first inline passage defining a primary condensate flow path between an upstream inlet and a downstream outlet, and a branch passage extending substantially perpendicular to the primary condensate flow path, the tee fitting being a schedule 80 PVC fitting having a GHT metal insert fixedly embedded in the PVC body at the branch passage;

a first shut-off valve comprising a schedule 40 PVC slip ball valve solvent-welded to the upstream inlet of the tee fitting, the first shut-off valve being positioned between the air handler and the tee fitting;

a second shut-off valve comprising a brass ball valve directly coupled to the branch passage of the tee fitting, the brass ball valve having a hose-facing end with female garden hose thread (GHT) for threadedly receiving a standard garden hose and a tee-facing end with male GHT threadedly engaged with the GHT metal insert of the tee fitting;

wherein the first shut-off valve, when in an open position, permits condensate to flow through the primary condensate flow path from the air handler to the drain line during normal HVAC operation; the second shut-off valve, when in a closed position, maintains an air-tight seal at the branch passage so as to preserve negative pressure integrity of the condensate drain line during normal HVAC operation; and the second shut-off valve, when in an open position and the first shut-off valve is in a closed position, permits selective diversion of water from a garden hose through the branch passage and into the downstream outlet of the tee fitting to flush the condensate drain line.

2. The condensate drain line service assembly of claim 1, wherein the GHT metal insert is a brass insert fixedly embedded in and co-molded with the schedule 80 PVC body of the tee fitting, the GHT metal insert having female garden hose thread (GHT) sized and configured to directly receive a male GHT end of the brass ball valve without adapters.

3. The valve assembly of claim 1, wherein the shut-off valve between the female end and the male end of the garden hose connector is a brass valve.

4. The condensate drain line service assembly of claim 1, wherein the first shut-off valve is a schedule 40 PVC slip ball valve solvent-welded to the upstream inlet of the tee fitting on the air-handler side, and wherein the first shut-off valve, when closed, isolates the air handler from the condensate drain line during flushing operations.

5. A condensate drain line service assembly for installation in a condensate drain line of an HVAC system, comprising:

a unitary rigid schedule 80 PVC tee fitting having: (i) a first inline slip-fit socket defining an upstream inlet and a second inline slip-fit socket defining a downstream outlet, the upstream inlet and downstream outlet together defining a primary condensate flow path therethrough; and (ii) a single branch passage extending substantially perpendicular to the primary condensate flow path, the branch passage having a GHT metal insert fixedly embedded in the schedule 80 PVC body of the tee fitting, the tee fitting being configured to receive condensate flow from an air handler through the upstream inlet and discharge to a drain line through the downstream outlet; and a first shut-off valve comprising a schedule 40 PVC slip ball valve solvent-welded to the upstream inlet of the tee fitting and positioned between the tee fitting and the air handler; and a second shut-off valve comprising a brass ball valve directly coupled to the branch passage, the brass ball valve having a hose-facing end with female GHT for threadedly receiving a garden hose and a tee-facing end with male GHT threadedly engaged with the GHT metal insert of the tee fitting; and wherein the first shut-off valve, when open, and the second shut-off valve, when closed, collectively define a normally air-tight primary condensate flow path that maintains negative pressure integrity of the condensate drain line during normal HVAC operation; and wherein the second shut-off valve, when open and the first shut-off valve is closed, diverts water from a garden hose through the branch passage and into the downstream outlet to flush the condensate drain line without flooding the air handler.

6. The condensate drain line service assembly of claim 5, wherein the second shut-off valve is a brass ball valve having female garden hose thread (GHT) on a hose-facing end and male garden hose thread (GHT) on a tee-facing end, and wherein the first shut-off valve is a schedule 40 PVC slip ball valve solvent-welded to the upstream inlet of the tee fitting on the air-handler side.

* * * * *